United States Patent
Peters

(10) Patent No.: US 10,605,200 B2
(45) Date of Patent: Mar. 31, 2020

(54) SERPENTINE BAFFLE FOR A GAS TURBINE ENGINE EXHAUST DUCT

(71) Applicant: UNITED TECHNOLOGIES CORPORATION, Hartford, CT (US)

(72) Inventor: Donald Peters, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 171 days.

(21) Appl. No.: 14/760,024

(22) PCT Filed: Jan. 11, 2013

(86) PCT No.: PCT/US2013/021204
§ 371 (c)(1),
(2) Date: Jul. 9, 2015

(87) PCT Pub. No.: WO2014/109758
PCT Pub. Date: Jul. 17, 2014

(65) Prior Publication Data
US 2015/0369172 A1    Dec. 24, 2015

(51) Int. Cl.
*F02K 1/80*    (2006.01)
*F02C 7/24*    (2006.01)
(Continued)

(52) U.S. Cl.
CPC ............ *F02K 1/822* (2013.01); *F01D 25/24* (2013.01); *F02K 1/825* (2013.01); *F05D 2250/185* (2013.01); *Y02T 50/675* (2013.01)

(58) Field of Classification Search
CPC . F01D 5/00; F01D 5/181; F01D 5/188; F01D 5/189; F01D 9/023; F01D 25/24; F01D 25/243; F01D 25/14; F01D 25/145; F23R 3/002; F23R 3/007; F02K 1/1292; F02K 9/972; F02K 1/805; F02K 1/822;
(Continued)

(56) References Cited

U.S. PATENT DOCUMENTS

| 2,644,777 A | * | 7/1953 | Havens | .................. | B21D 13/10 |
| | | | | | 244/119 |
| 3,612,400 A | * | 10/1971 | Johnson | ................ | F02K 1/1269 |
| | | | | | 239/265.19 |

(Continued)

FOREIGN PATENT DOCUMENTS

GB    660690    11/1951

OTHER PUBLICATIONS

Supplementary European search report for Application No. 13870922.5-1607 dated Jun. 21, 2016.

*Primary Examiner* — Andrew H Nguyen
(74) *Attorney, Agent, or Firm* — Bachman & LaPointe, PC

(57) ABSTRACT

A serpentine baffle for a liner assembly of a gas turbine engine according to one disclosed non-limiting embodiment of the present disclosure includes a wall that defines a serpentine shape and a multiple of tabs which extend from the wall. In a further embodiment of the foregoing embodiment, the wall and the multiple of tabs are formed from a single cross-shaped piece. In a further embodiment of any of the foregoing embodiments, wherein at least one of the multiple of tabs is located adjacent to a distal end of the wall. In a further embodiment of any of the foregoing embodiments, the multiple of tabs are perpendicular to the wall.

21 Claims, 11 Drawing Sheets

(51) Int. Cl.
  *F01D 25/24*   (2006.01)
  *F02K 1/82*    (2006.01)
(58) Field of Classification Search
  CPC .... F02K 1/80; F02K 1/827; F02C 7/20; F02C 7/24; F05D 2260/2214; F05D 2260/22141; F05D 2250/184; F05D 2250/185
  See application file for complete search history.

(56) References Cited

U.S. PATENT DOCUMENTS

| | | | |
|---|---|---|---|
| 6,041,590 A * | 3/2000 | Hayton | F02K 1/822 60/766 |
| 6,199,371 B1 | 3/2001 | Brewer et al. | |
| 6,360,527 B1 * | 3/2002 | Feder | F02K 1/008 239/265.35 |
| 7,631,481 B2 | 12/2009 | Cowan et al. | |
| 8,127,526 B2 * | 3/2012 | Murphy | F02K 1/822 60/39.5 |
| 2006/0034679 A1 * | 2/2006 | Harding | F01D 5/189 415/115 |
| 2006/0112676 A1 * | 6/2006 | Cowan | F02K 1/004 60/266 |
| 2006/0180388 A1 * | 8/2006 | Brown | B64D 41/00 181/250 |
| 2008/0060343 A1 * | 3/2008 | Narayanan | B64D 33/06 60/262 |
| 2009/0139221 A1 * | 6/2009 | Farah | F02K 1/822 60/324 |
| 2009/0140497 A1 * | 6/2009 | Roberts | F01D 11/005 277/636 |
| 2009/0145137 A1 * | 6/2009 | Rizkalla | F01D 9/023 60/796 |
| 2009/0193813 A1 * | 8/2009 | Garry | F23M 5/04 60/796 |
| 2010/0242494 A1 * | 9/2010 | Mulcaire | F01D 25/24 60/796 |

* cited by examiner

US 10,605,200 B2

SERPENTINE BAFFLE FOR A GAS TURBINE ENGINE EXHAUST DUCT

BACKGROUND

The present disclosure relates to gas turbine engines, and more particularly to an exhaust duct therefor.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase the thrust. The increase in thrust is produced when oxygen contained within the exhaust gases of the engine downstream of the turbine section is injected with fuel and burned to generate a second combustion.

Due in part to the harsh environment of the second combustion, a liner assembly is disposed between the exhaust gas and the exhaust duct. These may be of single or double walled construction, with a hot sheet and a cold sheet. Cooling air typically sourced from a fan section is flowed between the liner assembly and exhaust duct then discharged through the liner assembly.

The attachment of the hot sheet and the cold sheet is typically accomplished with Z-band structural supports which, along with baffles fitted transverse thereto control the flow pressures within the exhaust duct. As engine pressures vary axially and circumferentially in non-axisymmetric systems, the exhaust duct is partitioned both axially and circumferentially. The baffles fit within slots in the Z-band structural supports and, although effective, may rub against the Z-band structural supports which may cause wear from the high acoustic environment. Furthermore, the Z-band structural supports and baffles may not be readily applicable to non-axisymmetric exhaust ducts.

SUMMARY

A serpentine baffle for a liner assembly of a gas turbine engine according to one disclosed non-limiting embodiment of the present disclosure includes a wall that defines a serpentine shape and a multiple of tabs which extend from the wall.

In a further embodiment of the foregoing embodiment, the wall and the multiple of tabs are formed from a single cross-shaped piece.

In a further embodiment of any of the foregoing embodiments, wherein at least one of the multiple of tabs is located adjacent to a distal end of the wall.

In a further embodiment of any of the foregoing embodiments, the multiple of tabs are perpendicular to the wall.

In a further embodiment of any of the foregoing embodiments, wherein at least one of the multiple of tabs includes a hole to receive a fastener. In the alternative or additionally thereto, in the foregoing embodiment the fastener is a rivet.

In a further embodiment of any of the foregoing embodiments, wherein an edge of the wall is non-linear.

A liner assembly for a gas turbine engine according to another disclosed non-limiting embodiment of the present disclosure includes a cold sheet, a hot sheet proximate the cold sheet, a multiple of structural supports between the cold sheet and the hot sheet and a multiple of serpentine baffles attached to the cold sheet.

In a further embodiment of the foregoing embodiment, the serpentine baffle is riveted to the cold sheet.

In a further embodiment of any of the foregoing embodiments, the cold sheet is corrugated.

In a further embodiment of any of the foregoing embodiments, the hot sheet and the cold sheet are axisymmetric in cross-section.

In a further embodiment of any of the foregoing embodiments, the hot sheet and the cold sheet are non-axisymmetric in cross-section.

In a further embodiment of any of the foregoing embodiments, the hot sheet and the cold sheet are oval in cross-section.

In a further embodiment of any of the foregoing embodiment, the hot sheet and the cold sheet are rectilinear in cross-section.

In a further embodiment of any of the foregoing embodiments, the hot sheet and the cold sheet define a serpentine duct.

In a further embodiment of any of the foregoing embodiment, the hot sheet and the cold sheet terminate in a nozzle section with a convergent-divergent nozzle.

In a further embodiment of any of the foregoing embodiments, the hot sheet and the cold sheet terminate in a nozzle section with a two-dimensional non-axisymmetric nozzle.

In a further embodiment of any of the foregoing embodiments, the multiple of serpentine baffles are non-uniformly distributed between the hot sheet and the cold sheet.

In a further embodiment of any of the foregoing embodiments, wherein a first of the multiple of structural supports defines a first spring rate and a second of the multiple of structural supports defines a second spring rate, the first spring rate different than the second spring rate.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
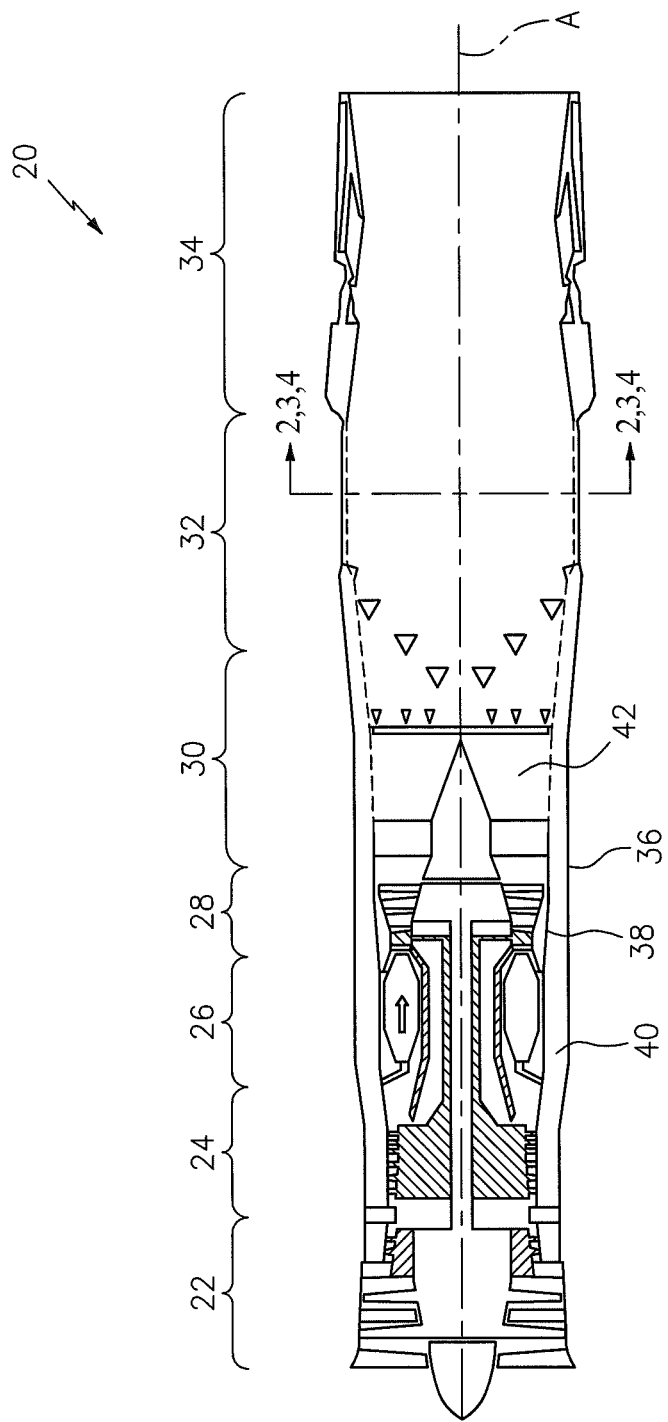
FIG. 1 is a general schematic view of an exemplary gas turbine engine for use with the present disclosure.

FIG. 1 schematically illustrates a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle section 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle and other engine architectures.

An outer structure 36 and an inner structure 38 define a generally annular secondary airflow path 40 around a core primary airflow path 42. Various structure and modules may define the outer structure 36 and the inner structure 38 which essentially define an exoskeleton to support the rotational hardware therein.

Air that enters the fan section 22 is divided between a primary airflow through the primary airflow path 42 and a secondary airflow through the secondary airflow path 40. The primary airflow passes through the combustor section 26, the turbine section 28, then the augmentor section 30 where fuel may be selectively injected and burned to generate additional thrust through the nozzle section 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein is any airflow different from the primary airflow. The secondary airflow may ultimately be at least partially injected into the primary airflow path 42 adjacent to the exhaust duct section 32 and the nozzle section 34.

Figure 4:
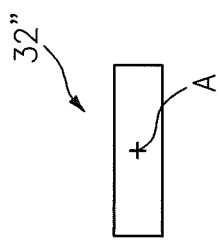
FIG. 4 is a lateral cross section of an exhaust duct section according to another non-limiting embodiment.
Figure 3:
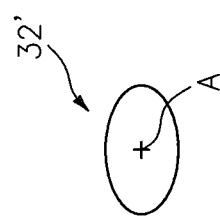
FIG. 3 is a lateral cross section of an exhaust duct section according to another non-limiting embodiment.
Figure 2:
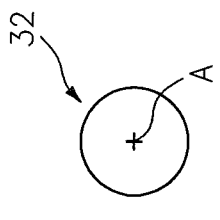
FIG. 2 is a lateral cross section of an exhaust duct section according to one non-limiting embodiment.
Figure 5:
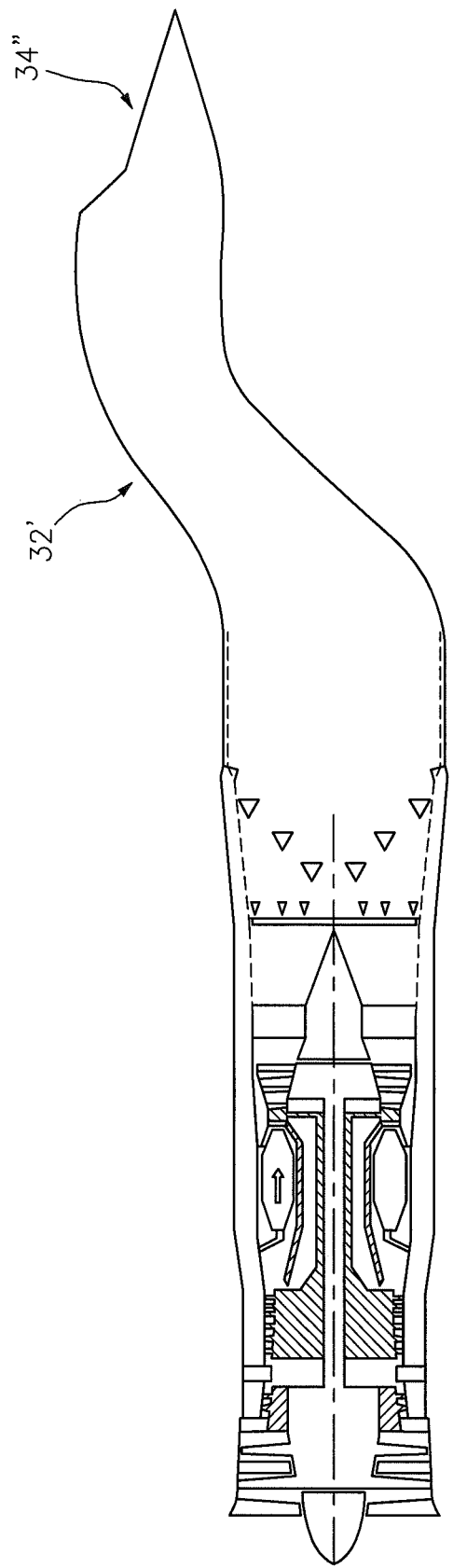
FIG. 5 is an exhaust duct section according to another non-limiting embodiment.
Figure 6:
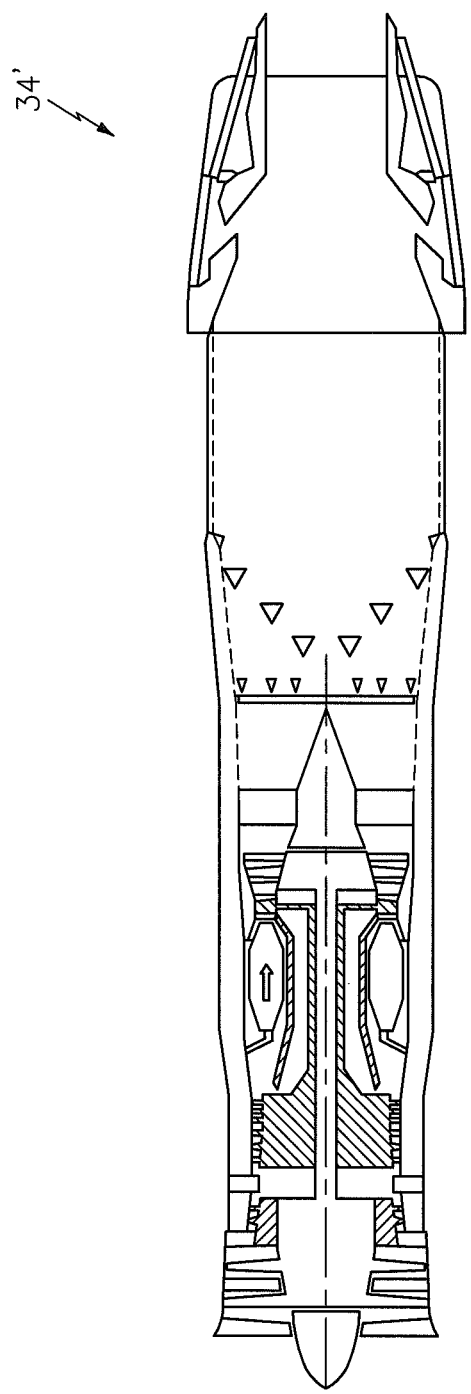
FIG. 6 is an exhaust duct section according to another non-limiting embodiment.

With reference to FIG. 2, the exhaust duct section 32 may be circular in cross-section as typical of an axis-symmetric augmented low bypass turbofan. In another disclosed non-limiting embodiment the exhaust duct section 32' may be non-axisymmetric in cross-section to include, but not be limited to, an oval cross-section (FIG. 3) or a rectilinear cross-section (FIG. 4). In addition to the various cross-sections, the exhaust duct section 32' may be non-linear with respect to the central longitudinal engine axis A to form, for example, a serpentine shape to block direct view to the turbine section 28 (FIG. 5). Furthermore, in addition to the various cross-sections and the various longitudinal shapes, the exhaust duct section 32 may terminate in a convergent divergent nozzle section 34 (FIG. 1), a non-axisymmetric two-dimensional (2D) vectorable nozzle section 34' (FIG. 6), a flattened slot convergent nozzle of high aspect ratio 34" (FIG. 5) or other exhaust duct arrangement.

Figure 7:
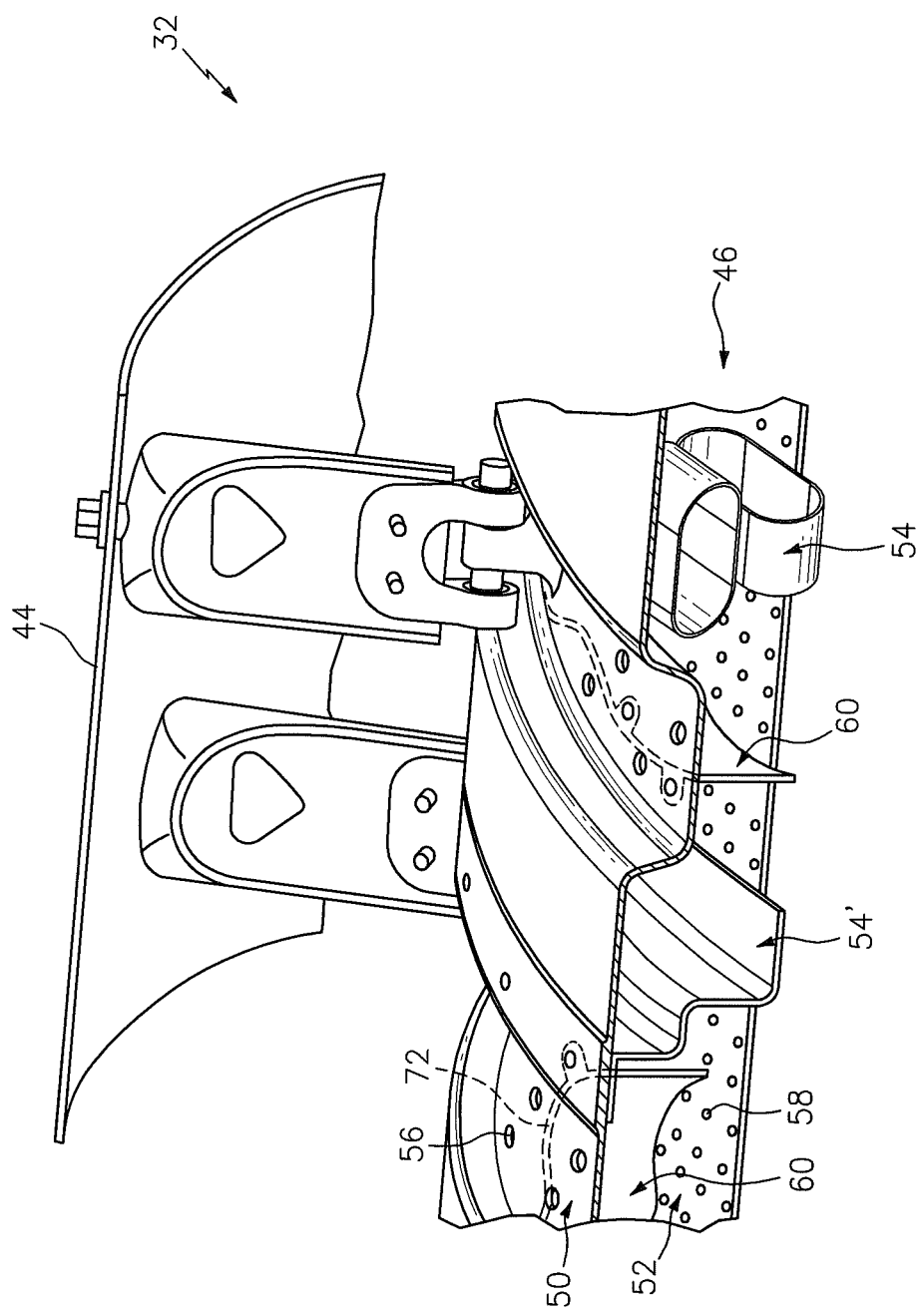
FIG. 7 is an expanded longitudinal perspective cross-sectional view of a liner assembly with structural supports and a serpentine baffle.

With reference to FIG. 7, the exhaust duct section 32 generally includes an outer exhaust duct case 44 (illustrated schematically) of the outer structure 36 and a liner assembly 46 spaced inward therefrom. The liner assembly 46 operates as a heat shield to protect the outer exhaust duct case 44 from the extremely hot combustion gases in the primary airflow path 42. Air discharged from, for example, the fan section 22 is communicated through an annular passageway 48 defined between the outer exhaust duct case 44 and the inner liner assembly 46. Since fan air and is relatively cool compared to the hot gases in the primary airflow path 42, the fan air cools the liner assembly 46 to enhance the life and reliability thereof.

The liner assembly 46 generally includes a cold sheet 50 separated from a hot sheet 52 by a plurality of structural supports 54 (also shown in FIG. 8) which attach the cold sheet 50 to the hot sheet 52. During engine operation, the cold sheet 50 receives relatively large pressure loads and deflections, while the hot sheet 52 receives relatively small pressure loads and deflections and thereby better retains heat resistant coatings. The plurality of structural supports 54 provides stiffness to the liner assembly 46 yet operate as springs to accommodate movement from thermal deflections between the cold sheet 50 and the hot sheet 52. In another disclosed, non-limiting embodiment, the structural supports 54' may be Z-bands or other structures. It should be appreciated that various types of structural supports as well as locations therefor may be used herewith and that the illustrated structural supports 54 are but non-limiting examples.

The cold sheet 50 may be corrugated with various rippled or non-planar surfaces and include a multiple of metering holes 56 to receive secondary airflow from between the outer exhaust duct case 44 and the liner assembly 46. The secondary airflow is communicated through effusion holes 58 in the hot sheet 52. The effusion holes are generally more prevalent and larger than the metering holes 56 such that the secondary airflow provides film cooling to sheath the liner assembly 46 with secondary airflow.

Figure 8:
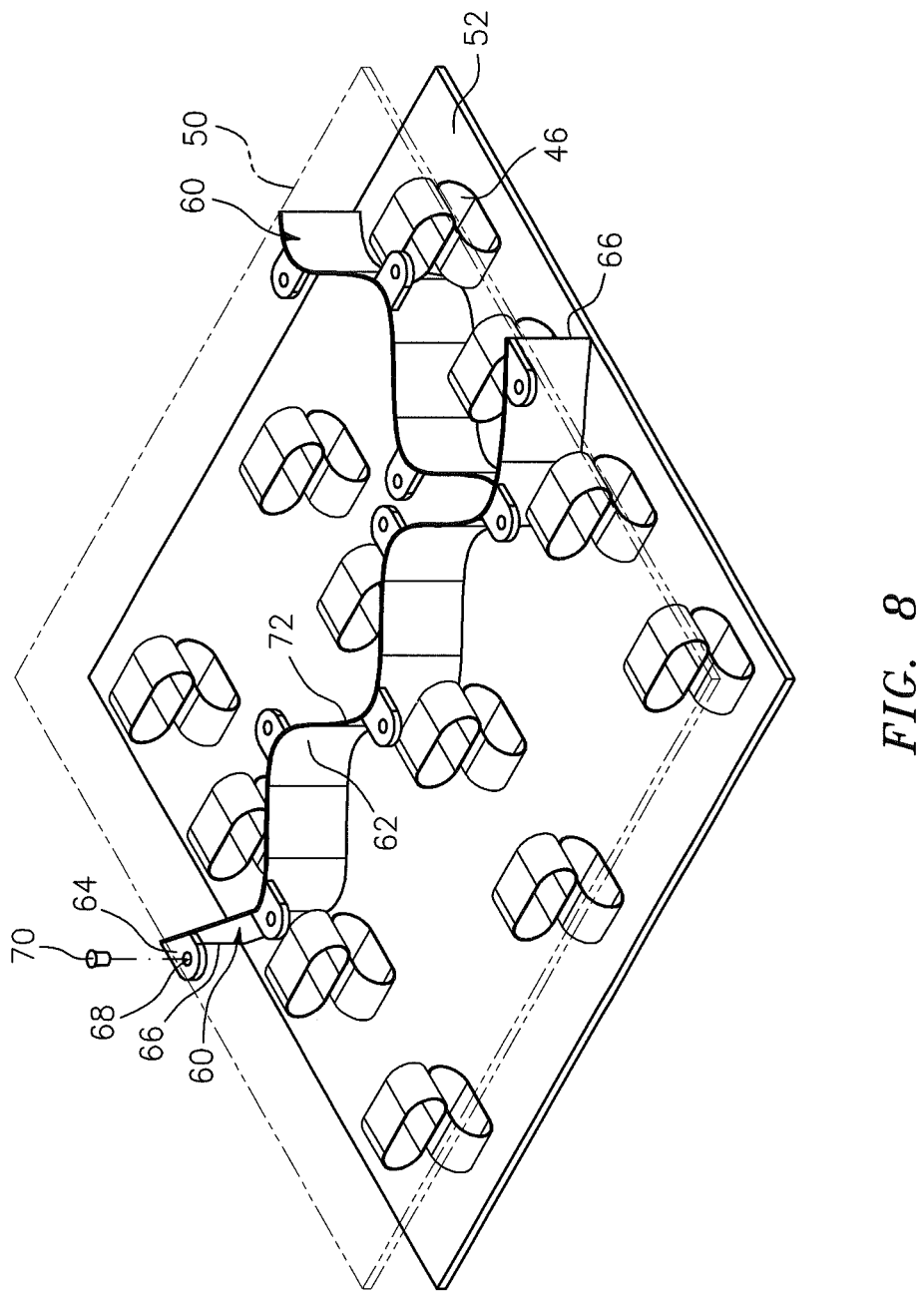
FIG. 8 is an perspective partial phantom view of a liner assembly of FIG. 7.

With reference to FIG. 8, a multiple of serpentine baffles 60 are mounted to the cold sheet 50. Each of the serpentine baffles 60 generally includes a wall 62 of a serpentine shape and a multiple of tabs 64 that extend therefrom. The serpentine baffles 60 may be manufactured from a stamped sheet metal detail that is formed into a generally serpentine or wave shape wall 62 from which the tabs 64 are bent generally perpendicular thereto. In one disclosed, non-limiting embodiment, a tab 64 is located at each distal end 66 of the wall 62 to avoid free ends.

Figure 9:
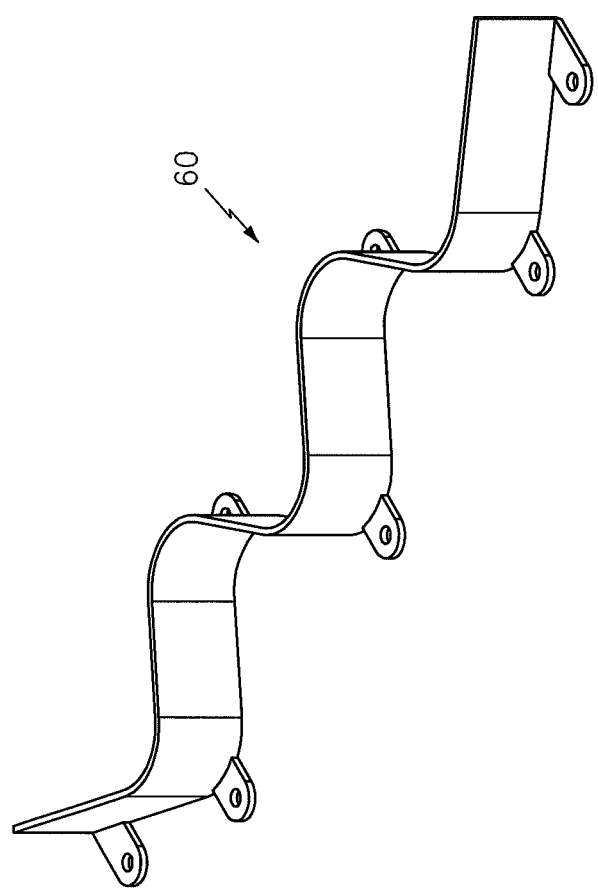
FIG. 9 is an expanded perspective view of a serpentine baffle.
Figure 10:
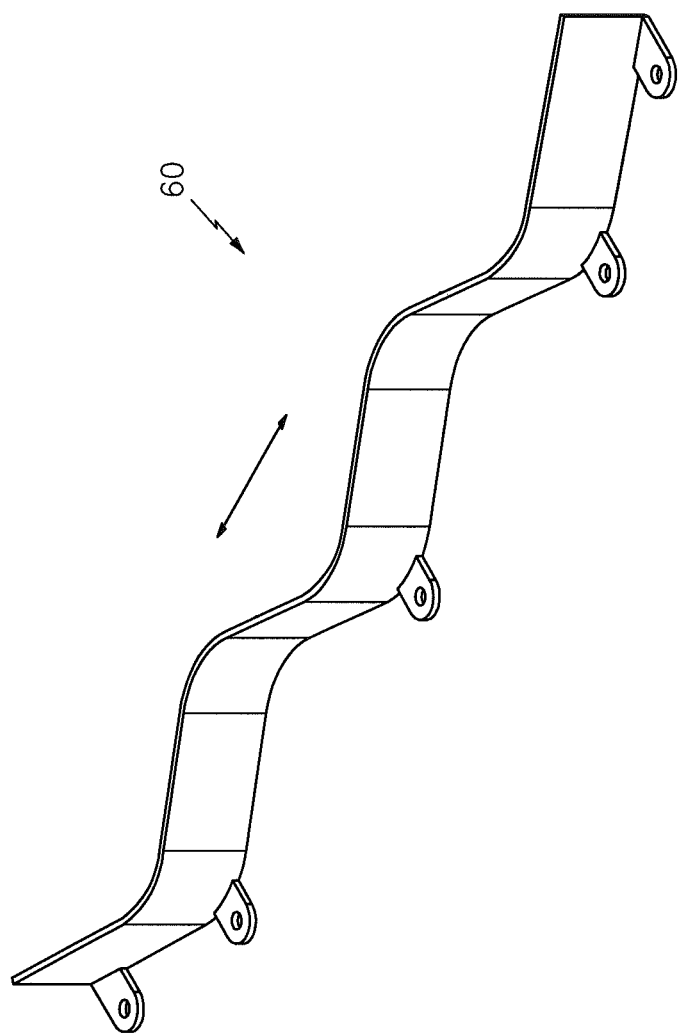
FIG. 10 is an expanded perspective view of the serpentine baffle of FIG. 9 elongated.
Figure 11:
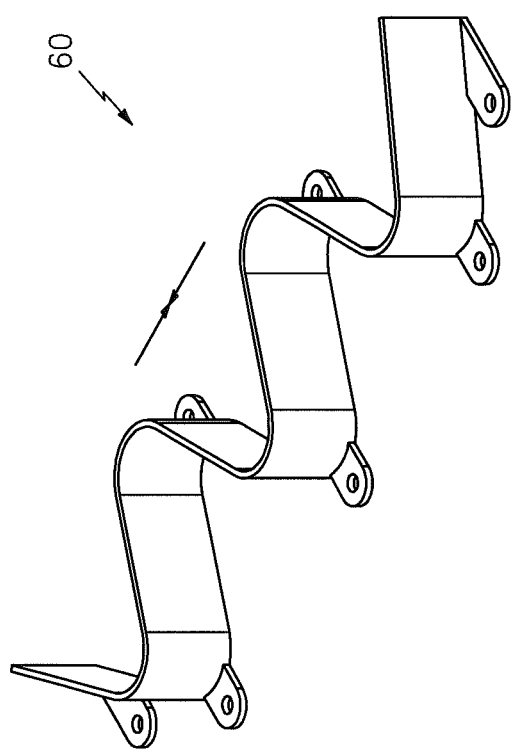
FIG. 11 is an expanded perspective view of the serpentine baffle of FIG. 9 compressed.
Figure 12:
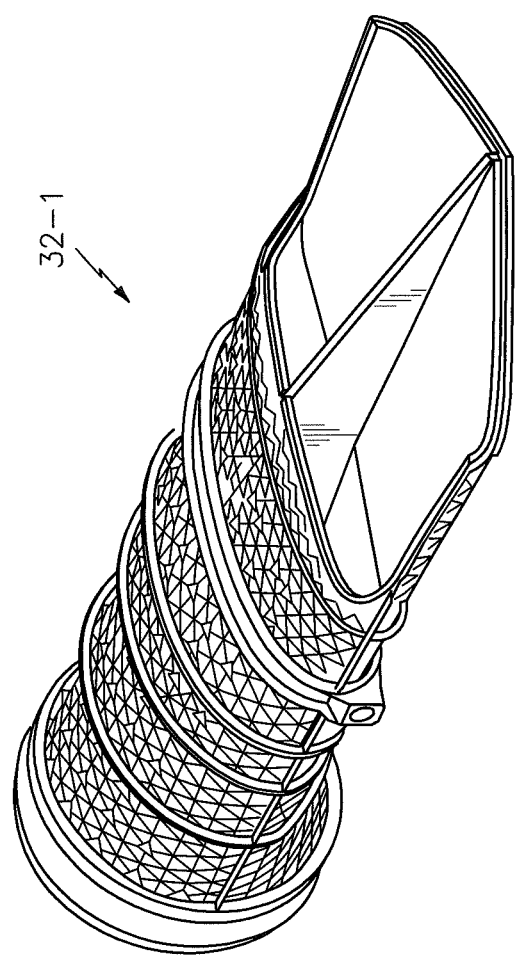
FIG. 12 is a perspective view of an exhaust section according to another disclosed non-limiting embodiment for use with the liner assembly.
Figure 13:
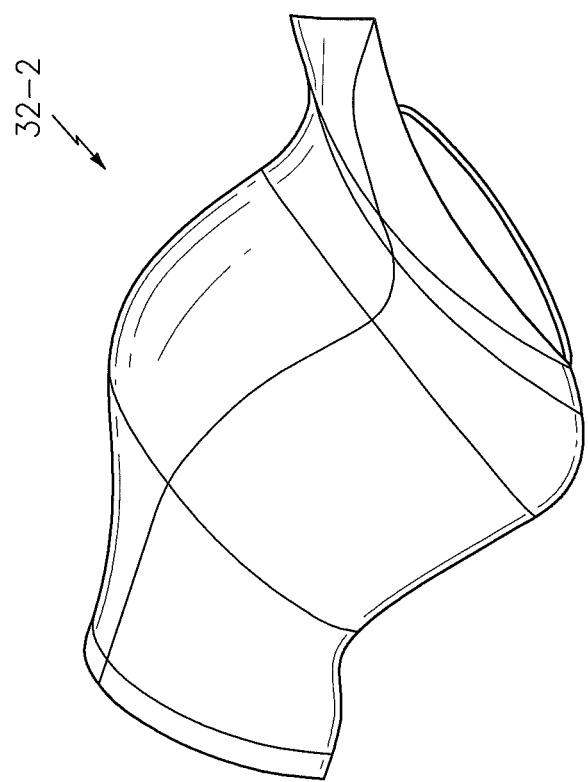
FIG. 13 is a perspective view of an exhaust section according to another disclosed non-limiting embodiment for use with the liner assembly.

Each of the tabs 64 includes a hole 68 to receive a fastener 70 such as a rivet to readily attach the serpentine baffles 60 to the cold sheet 50. Alternatively, the tabs 64 may be welded or brazed to the cold sheet 50. As the serpentine baffles 60 are attached to the cold sheet 50, the serpentine baffles 60 are readily mounted independent of the structural supports 54 and are also readily adjusted though an accordion-like contraction or expansion of the serpentine wall 62 (FIGS. 9-11). This facilitates baffling of non-axis symmetric exhaust duct sections in both lateral and longitudinal directions such as the exhaust duct section 32-1 (FIG. 12) and the exhaust duct section 32-2 (FIG. 13). That is, the serpentine baffles 60 may be more numerous in some locations and less numerous in other locations to provide a desired secondary airflow containment and need not be dependent upon the structural supports 54 for location.

The serpentine baffles 60 avoid typical wear and acoustic issues such as "chatter" as the serpentine baffles 60 are riveted to the cold sheet 50. That is, the serpentine shape provides structural stiffness to the liner assembly 46 as well as baffles the secondary airflow. The serpentine baffles 60 are riveted to the cold sheet 50 and typically provide a clearance with the hot sheet 52 of approximately 0.003" (0.1 mm). As the serpentine baffles 60 may be manufactured from a stamped sheet metal detail, an edge 72 of the wall 62 from which the tabs 64 extend may be readily shaped to accommodate corrugated, rippled or non-planar surfaces of the cold sheet 50.

The multiple of structural supports 54 provide thermal compliance between the cold sheet 50 and the hot sheet 52 of the liner assembly irrespective of exhaust duct architecture while the serpentine baffles 60 segregate secondary airflow communicated through the effusion holes 58 in the hot sheet 52 to desired regions. Furthermore, the serpentine baffles 60, supported only by the cold sheet 50, avoid thermal conflict with the hot sheet 52 especially advantageous for non-axisymmetric ducts. The serpentine baffles 60 thereby readily survive the extreme acoustic environment during, for example, augmentor operation to minimize "chatter". Moreover, the serpentine baffles 60 are relatively uncomplicated and inexpensive to manufacture compared to related art Z-bands.

It should be understood that like reference numerals identify corresponding or similar elements throughout the several drawings. It should also be understood that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A liner assembly for a gas turbine engine comprising:
   a corrugated cold sheet that includes a multiple of metering holes to receive a secondary airflow;
   a hot sheet proximate said cold sheet, said hot sheet includes a multiple of effusion holes;
   a non-structural wall that defines a serpentine shaped baffle for the secondary airflow; and
   a multiple of tabs which extend from a first edge of said wall for attachment to the cold sheet, the non-structural wall supported only by the cold sheet, such that the first edge of said wall is adjacent to said cold sheet and said wall is transverse to the cold sheet and the hot sheet, wherein said wall segregates the secondary airflow communicated through the multiple of effusion holes, an opposite edge of said wall forms a clearance with said hot sheet.

2. The liner assembly as recited in claim 1, wherein said wall and said multiple of tabs are formed from a single cross-shaped piece.

3. The liner assembly as recited in claim 1, wherein at least one of said multiple of tabs is located adjacent to a distal end of said wall.

4. The liner assembly as recited in claim 1, wherein said multiple of tabs are perpendicular to said wall and said wall is perpendicular to said hot sheet and said cold sheet.

5. The liner assembly as recited in claim 1, wherein at least one of said multiple of tabs includes a hole to receive a fastener to secure said wall only to said cold sheet.

6. The liner assembly as recited in claim 5, wherein said fastener is a rivet.

7. The liner assembly as recited in claim 1, wherein said first edge of said wall is non-linear and defines the serpentine shape.

8. The liner assembly as recited in claim 1, wherein the multiple of effusion holes are more prevalent than the multiple of metering holes.

9. The liner assembly as recited in claim 1, wherein each of the multiple of effusion holes are of a larger size than each of the multiple of metering holes.

10. A liner assembly for a gas turbine engine comprising:
    a corrugated cold sheet that includes a multiple of metering holes to receive a secondary airflow;
    a hot sheet proximate said cold sheet, said hot sheet includes a multiple of effusion holes;
    a multiple of structural supports between said cold sheet and said hot sheet, said multiple of structural supports provide stiffness to the liner assembly and operate as springs to accommodate movement from thermal deflections between said cold sheet and said hot sheet; and
    a multiple of non-structural serpentine baffles supported only by said cold sheet such that a first edge of each of said multiple of serpentine baffles is secured to said cold sheet and each of said multiple of serpentine baffles are generally perpendicular to the cold sheet and the hot sheet, an opposite edge of each of the multiple of non-structural serpentine baffles forming a clearance with said hot sheet.

11. The liner assembly as recited in claim 10, wherein each of said multiple of serpentine baffles is riveted to said cold sheet.

12. The liner assembly as recited in claim 10, wherein said hot sheet and said cold sheet are axisymmetric in cross-section.

13. The liner assembly as recited in claim 10, wherein said hot sheet and said cold sheet are non-axisymmetric in cross-section.

14. The liner assembly as recited in claim 10, wherein said hot sheet and said cold sheet are oval in cross-section.

15. The liner assembly as recited in claim 10, wherein said hot sheet and said cold sheet are rectilinear in cross-section.

16. The liner assembly as recited in claim 10, wherein said hot sheet and said cold sheet define a serpentine duct.

17. The liner assembly as recited in claim 10, wherein said hot sheet and said cold sheet terminate in a nozzle section with a convergent-divergent nozzle.

18. The liner assembly as recited in claim 10, wherein said hot sheet and said cold sheet terminate in a nozzle section with a two-dimensional non-axisymmetric nozzle.

19. The liner assembly as recited in claim 10, wherein said multiple of serpentine baffles are non-uniformly distributed between said hot sheet and said cold sheet.

20. The liner assembly as recited in claim 10, wherein a first of said multiple of structural supports defines a first spring rate and a second of said multiple of structural supports defines a second spring rate, said first spring rate different than said second spring rate.

21. The liner assembly as recited in claim 10, wherein said multiple of serpentine baffles are mounted independent of the multiple of structural supports between said cold sheet and said hot sheet, said multiple of structural supports adjusted through an accordion-like contraction or expansion of said multiple of serpentine baffles in response to deflections between said cold sheet and said hot sheet.

* * * * *